United States Patent [19]

Limerick

[11] Patent Number: 5,410,874
[45] Date of Patent: May 2, 1995

[54] METHOD AND APPARATUS FOR INCREASING COMBUSTION CHAMBER PRESSURE IN A HIGH PRESSURE EXPANDER CYCLE ROCKET ENGINE

[75] Inventor: Charles D. Limerick, Palm Beach Gardens, Fla.

[73] Assignee: United Technologies Corporation, Hartford, Conn.

[21] Appl. No.: 617,332

[22] Filed: Nov. 19, 1990

[51] Int. Cl.6 .......................... F02K 9/00; F02K 11/00
[52] U.S. Cl. .......................................... 60/267; 60/259
[58] Field of Search ................... 60/267, 266, 259, 271

[56] References Cited

U.S. PATENT DOCUMENTS

| | | | |
|---|---|---|---|
| 3,028,729 | 10/1962 | Ledwith | 60/259 |
| 3,623,329 | 11/1971 | Abild | 60/267 |
| 4,073,138 | 2/1978 | Beichel | 60/267 |
| 4,583,362 | 4/1986 | Wagner | 60/267 |

Primary Examiner—David Brown

[57] ABSTRACT

Disclosed is a method and apparatus for producing combustion chamber pressure in excess of 1500 psia at thrust levels in excess of 100,000 pounds in an expander cycle rocket engine.

3 Claims, 3 Drawing Sheets

METHOD AND APPARATUS FOR INCREASING COMBUSTION CHAMBER PRESSURE IN A HIGH PRESSURE EXPANDER CYCLE ROCKET ENGINE

FIELD OF THE INVENTION

This invention relates to expander cycle rocket engines, and specifically to such engines having thrust in excess of 100,000 pounds.

BACKGROUND OF THE INVENTION

High thrust (in excess of 100,000 pounds) expander cycle rocket engines have traditionally been limited to chamber pressures below 1500 psia because of lack of turbine power available to the fuel turbopump. In a typical expander cycle rocket engine, fuel from the fuel turbopump is pumped through the cooling liner and tubular nozzle of the engine's combustion chamber/nozzle assembly where the fuel is heated and then fed to a turbine which drives the fuel turbopump. In order to increase the combustion chamber pressure, fuel flow to the combustion chamber must be increased. However, as fuel flow through the cooling liner and tubular nozzle increases, the temperature of the fuel at the turbopump turbine inlet decreases due to the increase in mass flow rate of the fuel. At the same time, the fuel turbopump must do more work to provide the increased mass flow rate of fuel. Although the energy available to the fuel turbopump turbine is a function of both the mass flow rate of the fuel and the turbine inlet temperature, the increase in the mass flow rate of fuel cannot offset the resulting decrease in turbine inlet temperature which occurs as a result of the increased fuel flow rate. Consequently, the decrease in turbine inlet temperature and the increase in work required by the turbopump at the higher fuel flow rates act to limit the maximum fuel flow rate to the combustion chamber, thereby limiting combustion chamber pressure.

What is needed is an expander cycle rocket engine in which turbine power can be maintained at higher fuel mass flow rates, thereby providing combustion chamber pressures in excess of 1500 psia.

DISCLOSURE OF THE INVENTION

It is therefore an object of the present invention to provide an expander cycle rocket engine that can operate at combustion chamber pressures in excess of 1500 psia with thrust levels in excess of 100,000 pounds.

According to the present invention a regenerative high pressure split expander cycle rocket engine is disclosed in which fuel flow from one stage of the fuel pump is split into two fuel flowpaths, a first flowpath which heats the fuel to provide the energy to drive the fuel pump, and a second flowpath which leads directly to a fuel mixing chamber immediately upstream of the combustion chamber/nozzle assembly. The first fuel flowpath includes a regenerator, or heat exchanger, downstream of the fuel pump to preheat the fuel prior to the fuel entering the cooling liner of the combustion chamber/nozzle assembly. Fuel flow which has been used to drive the fuel and oxidizer pumps is circulated through the regenerator to provide heat thereto, and then recombined with the fuel of the second fuel flowpath and introduced into the combustion chamber/nozzle assembly. The preheating of the fuel prior to entering the cooling liner, and the lower mass flow rate of fuel through the liner, provide a higher temperature fuel flow to drive the fuel and oxidizer pumps than could be obtained by flowing all of the fuel through the first fuel flowpath. In addition, in rocket engine systems using fuel pumps having multiple pump stages, the work of the fuel pump is reduced since only a portion of the fuel flows through more than one stage. The resulting expander cycle rocket engine provides combustion chamber pressure capability in excess of 1500 psia at thrust levels greater than 100,000 pounds.

The foregoing and other features and advantages of the present invention will become more apparent from the following description and accompanying drawings.

BEST MODE FOR CARRYING OUT THE INVENTION

Figure 1:
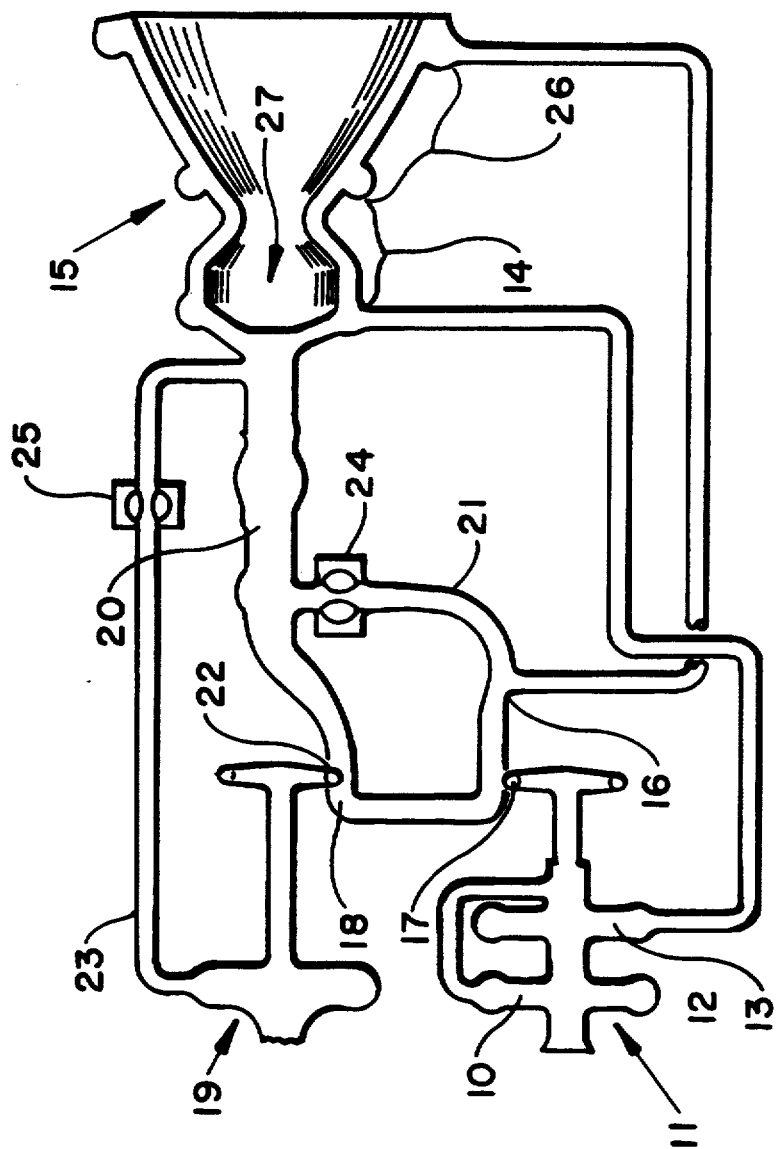
FIG. 1 is a schematic drawing of an expander cycle rocket engine of the prior art.

FIG. 1 shows a schematic of a typical expander cycle rocket engine of the prior art. Fuel flows into the first stage 10 of a multiple stage fuel turbopump 11, through the second stage 12, and then through the fuel outlet 13 of the fuel turbopump 11. The fuel then flows to the cooling liner 14 of the combustion chamber 27 and the tubular nozzle 26, cooling the liner 14 and nozzle 26 and heating the fuel. The combustion chamber 27 and the tubular nozzle 26 together form the combustion chamber/nozzle assembly referred to herein. The heated fuel is fed to the turbine inlet 16 of the fuel turbopump 11 to drive the fuel turbopump 11. Fuel exiting the fuel turbopump turbine 17 then flows to the turbine inlet 18 on the oxidizer turbopump 19 to drive the oxidizer turbopump 19. The fuel then flows into a mixing chamber 20 immediately upstream of the combustion chamber/nozzle assembly 15. A fuel bypass line 21 is typically provided between the fuel turbopump turbine inlet 16 and the mixing chamber 20 to allow a portion of the fuel flow to bypass the turbines 17, 22 of the turbopumps 11, 19 at high fuel flow rates. Both the fuel bypass line 21 and the oxidizer line 23 may have flow regulating devices 24, 25 therein to control flow rates and/or prevent backflow through the respective lines 21, 23.

Figure 2:
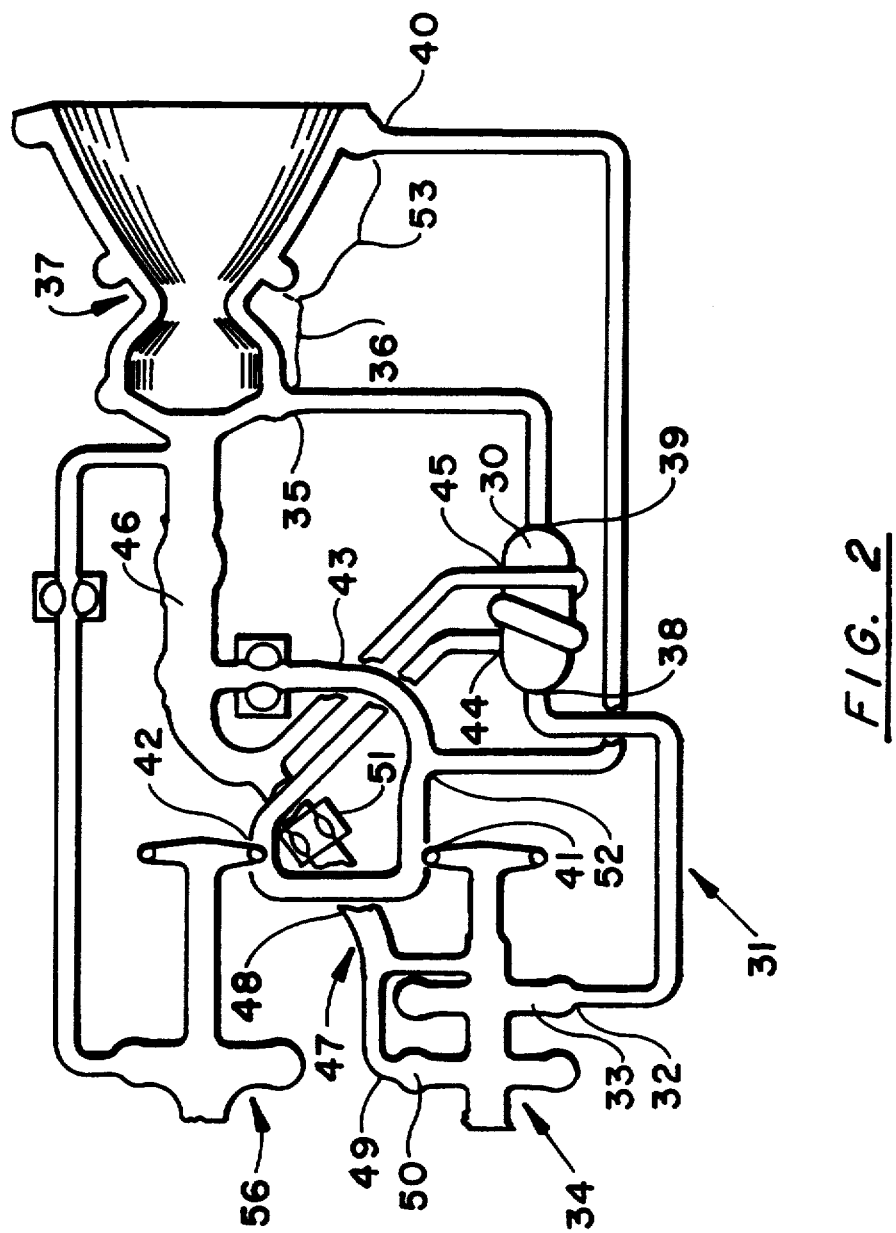
FIG. 2 is a schematic drawing of an expander cycle rocket engine of the present invention.

In the present invention shown in FIG. 2, a regenerator 30 is included in the first fuel flowpath 31 between the fuel outlet 32 of the second stage 33 of the fuel turbopump 34 and the inlet 35 of the cooling liner 36 of the combustion chamber/nozzle assembly 37. Fuel from the second stage 33 of the fuel turbopump 34 flows into the "cold side" inlet 38 of the regenerator 30, circulates therethrough, and exits through the "cold side" outlet 39, flowing to the cooling liner 36 and then through the tubular nozzle 53. The fuel flowing from the outlet 40 of the tubular nozzle 53 flows either through the turbines 41, 42 to drive the fuel and oxidizer turbopumps 34, 56, or through the first fuel bypass line 43. After flowing through the turbines 41, 42, the fuel is fed into the "hot side" inlet 44 of the regenerator 30, circulates therethrough to preheat the fuel flowing to the cooling liner 36, exits the regenerator 30 through the "hot side" outlet 45 and then is combined with fuel flowing through the first fuel bypass line 43 in the mixing chamber 46. Although the rocket engine of the present invention is disclosed as including turbopumps 34, 56 for the fuel and oxidizer, it is to be understood that the use of turbopumps in this discussion is for exemplary purposes only, and is not intended to limit the scope of the claims. For example, in some applications it may be desirable to replace the turbines 41, 42 which drive the fuel and oxidizer pumps with an expansible reciprocating motor (i.e., a steam engine) or other such motor which utilizes the energy of the heated fuel.

The preheating of fuel in the first fuel flowpath 31 by the regenerator 30 results in a higher turbine inlet temperature at the fuel turbopump turbine 41. As those skilled in the art will readily appreciate, the increased turbine inlet temperature provides more energy to the fuel turbopump turbine 41 which, in turn, can pump more fuel to the combustion chamber/nozzle assembly 37, producing a higher combustion chamber pressure. To further increase the turbine inlet temperature, a second fuel flow path 47 is provided which includes a second fuel pump line 48 connecting the outlet 49 of the first stage 50 of the fuel turbopump 34 directly to the mixing chamber 46, splitting the fuel flow so that a portion of the fuel from the first stage 50 of the fuel turbopump 34 flows directly into the mixing chamber 46. The second fuel flowpath 47 preferably includes a flow regulating device 51 to optimize the flow ratio between fuel flow in the first and second flowpaths 31, 47.

Figure 3:
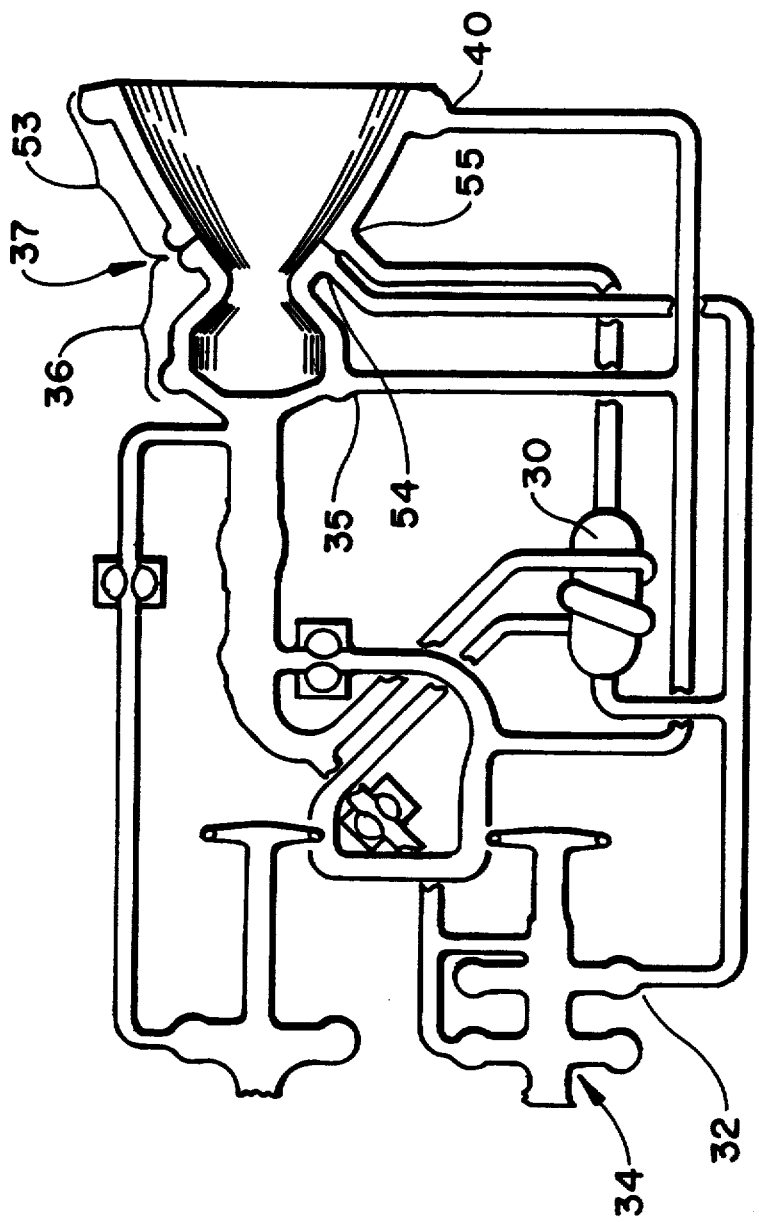
FIG. 3 is a schematic drawing of an alternate expander cycle rocket engine of the present invention.

Although the rocket engine of the present invention is disclosed as routing the fuel flow from the fuel turbopump discharge 32 to the regenerator 30 and then to the combustion chamber/nozzle assembly 37, this flow path is exemplary only and is not intended to limit the scope of the claims. For example, as shown in FIG. 3, the fuel flow could be split downstream of the fuel turbopump 34 with part of the flow going to cool the cooling liner 36 through liner inlet 35 and liner outlet 54, and the other part going to the regenerator 30 and then cooling the tubular nozzle 53 through nozzle inlet 55 and nozzle outlet 40, before being recombined with the fuel flow from the cooling liner 36. Likewise, the direction of coolant flow through the cooling liner 36 and/or nozzle 53 could also be reversed from the direction shown in FIG. 3.

As those skilled in the art will readily appreciate, since only a portion of the fuel flow exiting the first stage 50 of the fuel turbopump 34 flows through the second stage 33 thereof, the work of the fuel turbopump 34 is reduced, as compared to the prior art, for any given flow rate of fuel delivered to the combustion chamber/nozzle assembly 37. Likewise, since for a given fuel flow rate only a portion of the fuel flows through the chamber cooling liner 36 and tubular nozzle 53, and since that fuel flow portion is preheated by the regenerator 30 prior to entering the cooling liner 37, the temperature of the fuel at the inlet 52 of the fuel turbopump turbine 41 is significantly higher than the turbine inlet temperature of the fuel turbopump of the prior art. The higher turbine inlet temperature produces a higher turbine exit temperature from the oxidizer turbopump turbine 42. This higher turbine exit temperature results in hotter "hot side" fuel circulating through the regenerator 30, increasing the temperature differential between the "hot side" fuel and the "cold side" fuel.

Although the present invention-results in a lower fuel flow rate through the turbines 41, 42 of the turbopumps 34, 56, the loss in energy due to decreased mass flow rate of the fuel is offset by the increase in turbine inlet temperatures which occurs as a result of the lower fuel flow rates through the regenerator 30 and the cooling liner 36. In addition, since the present invention provides a higher temperature differential in the regenerator 30 than would occur if all of the fuel flowed through the cooling liner 36 and tubular nozzle 53, regenerator effectiveness is increased as a result of more effective heat transfer in the regenerator 30.

As a result of splitting the fuel flow and incorporating the regenerator 30 of the present invention, an expander cycle rocket engine is provided which can produce high chamber pressure capability (in excess of 1500 psia) at thrust levels greater than 100,000 pounds.

Although this invention has been shown and described with respect to detailed embodiments thereof, it will be understood by those skilled in the art that various changes in form and detail thereof may be made without departing from the spirit and scope of the claimed invention.

I claim:

1. An expander cycle rocket engine comprising:

a fuel pump having first stage and second stages connected to a first turbine and driven thereby, each stage including a fuel inlet and a fuel outlet, the first stage fuel outlet connected to the second stage fuel inlet by a first fuel pump line;

an oxidizer pump driven by a second turbine;

a combustion chamber/nozzle assembly including a cooling liner attached to an inner surface thereof, the cooling liner including a liner inlet and a liner outlet, and a cooled tubular nozzle forming the nozzle of the combustion chamber/nozzle assembly, the cooled tubular nozzle including a nozzle inlet and a nozzle outlet;

a fuel mixing chamber having a chamber outlet connected to the combustion chamber/nozzle assembly;

a first fuel flow path including a regenerator having a hot side inlet communicating with a hot side outlet, and a cold side inlet communicating with a cold side outlet, a first fuel line connecting the second stage fuel outlet to the cold side inlet, a second fuel line connecting the cold side outlet to the tubular nozzle inlet, a third fuel line connecting the first fuel line to the liner inlet, a fourth fuel line connecting the tubular nozzle outlet to a first turbine inlet adjacent the first turbine, a fifth fuel line connecting the liner outlet to the fourth fuel line, a sixth fuel line connecting a first turbine outlet adjacent the first turbine to a second turbine inlet adjacent the second turbine, the first turbine outlet communicating with the first turbine inlet through the first turbine, a seventh fuel line connecting a second turbine outlet adjacent the second turbine to the hot side inlet, the second turbine outlet communicating with the second turbine inlet through the second turbine, an eighth fuel line connecting the hot side outlet to the fuel mixing chamber, and a first bypass line connecting the first turbine inlet directly to the fuel mixing chamber;

a second fuel flow path including a second fuel pump line connecting the first fuel pump line directly to the fuel mixing chamber;

wherein fuel flowing from the fuel outlet of the first stage splits at the second fuel pump line to flow through one of the first or second fuel flow paths to the mixing chamber.

2. The system of claim 1 wherein the first bypass line and the second fuel pump line each include means for regulating fuel flow therethrough.

3. A method of increasing chamber pressure in an expander cycle rocket engine having a combustion chamber with a cooling liner attached to an inner surface thereof, a cooled tubular nozzle attached to the combustion chamber forming a combustion chamber/nozzle assembly, and means for driving oxidizer and fuel pumps to supply oxidizer and fuel to the combustion chamber, the method comprising:

splitting fuel flowing from one stage of the fuel pump into a first portion and a second portion;

pumping the first portion to a higher pressure by passing it through a second stage of the fuel pump;

splitting the first portion into a first part and a second part;

preheating the first part of the first portion by passing the first part through a regenerator;

heating the first part in the tubular nozzle;

heating the second part of the first portion in the cooling liner;

recombining the first and second parts of the first portion;

directing some of the first portion through the drive means of at least one of the pumps to drive the one pump;

transferring heat from the part of the first portion to the regenerator; and, recombining the first and second portions prior to introducing the portions into the combustion chamber/nozzle assembly.

* * * * *

UNITED STATES PATENT AND TRADEMARK OFFICE
CERTIFICATE OF CORRECTION

PATENT NO. : 5,410,874
DATED : May 2, 1995
INVENTOR(S) : Charles D. Limerick

It is certified that error appears in the above-indentified patent and that said Letters Patent is hereby corrected as shown below:

On the title page, please replace [57] ABSTRACT with the following ABSTRACT:

--A regenerative high pressure split expander cycle rocket engine is disclosed in which fuel flow from one stage is split into two flow paths one of which leads directly to further flow paths one of which is preheated before it enters the cooling liner. The two further flow paths then recombine to run the fuel and oxidizer pumps. By separating the tubular nozzle and cooling liner into two independently cooled components, the liner can be cooled with fuel directly from the fuel pump and the fuel flowing to the tubular nozzle can be preheated in the regenerator, thereby yielding a higher turbine inlet temperature at the fuel pump, therefore increasing available energy to drive the fuel pump and increasing the available chamber pressure.--

Signed and Sealed this

Twenty-fifth Day of July, 1995

*Attest:*

BRUCE LEHMAN

*Attesting Officer*     *Commissioner of Patents and Trademarks*